United States Patent

Neal et al.

[15] 3,640,092
[45] Feb. 8, 1972

[54] TORQUE LIMITER

[72] Inventors: Francis John Neal, Brewood; Jerzy Leon Courtenay; John Richard Simmons, both of Wolverhampton, all of England

[73] Assignee: H. M. Hobson Limited, London, England

[22] Filed: July 10, 1970

[21] Appl. No.: 53,927

[52] U.S. Cl. ...............................................64/28, 188/134
[51] Int. Cl. ........................................................F16d 7/06
[58] Field of Search ................64/28, 29; 188/134; 192/144, 192/51, 46

[56] References Cited

UNITED STATES PATENTS 2,668,426  2/1954  Hoover.......................................64/29
3,499,511  3/1970  Bouhot................................188/134 X
3,468,403  9/1969  Nasvytis..............................188/134 X
3,542,162  11/1970 Kerr.......................................188/134

*Primary Examiner*—Edward G. Favors
*Attorney*—E. T. Le Gates and Martin Kirkpatrick

[57] ABSTRACT

A torque limiter for limiting the torque which can be applied by an input shaft to an output shaft and comprising a fixed outer race, a cage within the race constituting the output member of the limiter, a cam constituting the input member of the limiter and normally operative to drive the cage by cooperation with one or more rollers confined by the cage and a torsion spring connected between the cam and the cage, the spring yielding, when excessive torque is reacted by the driven mechanism, to cause the cam to displace the roller or rollers into locking engagement with the outer race.

3 Claims, 3 Drawing Figures

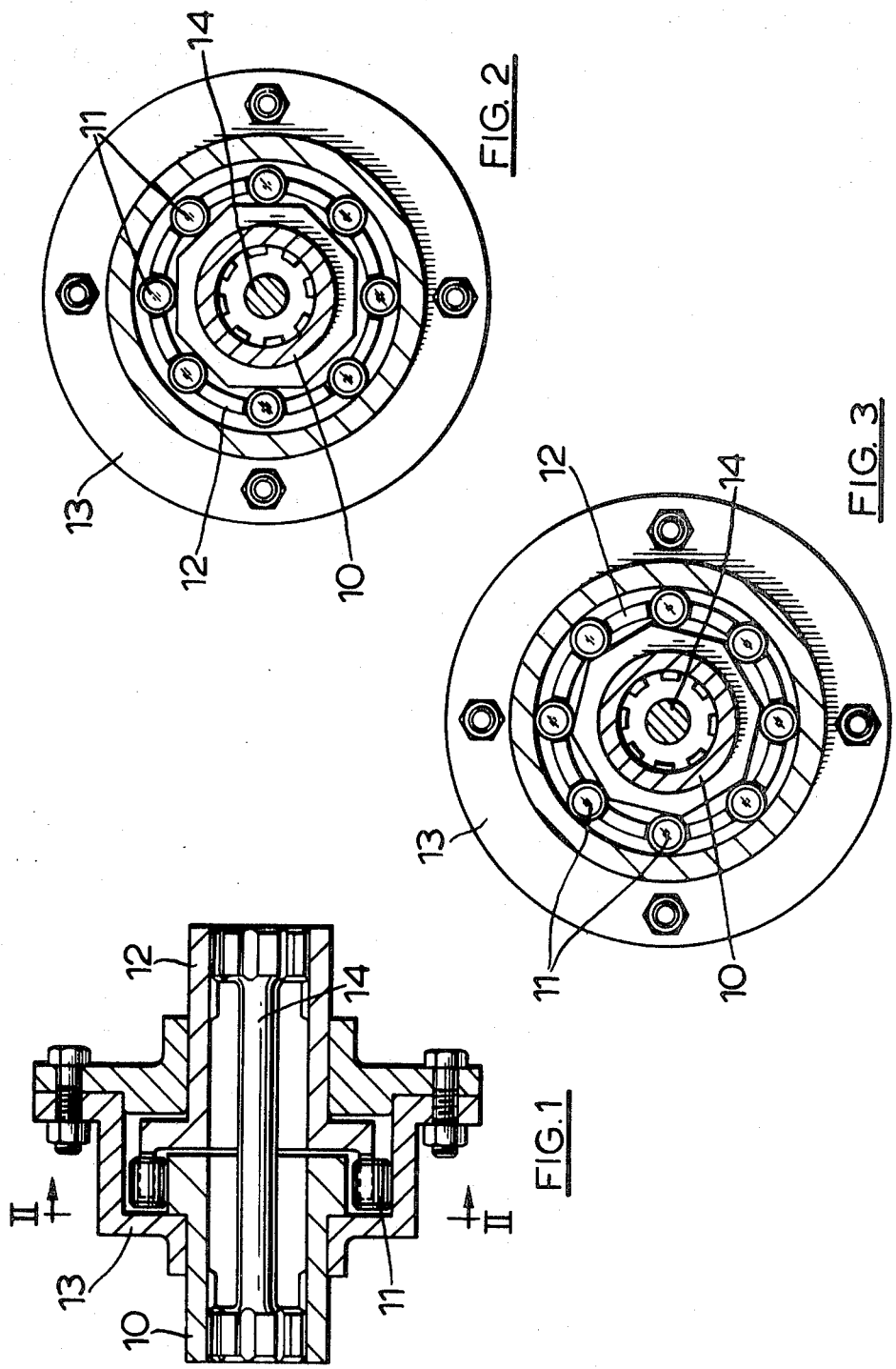

TORQUE LIMITER

This invention provides a torque limiter for limiting the torque which can be applied by an input shaft to an output shaft and comprising a fixed outer race, a cage within the race constituting the output member of the limiter, a cam constituting the input member of the limiter and normally operative to drive the cage by cooperation with one or more rollers confined by the cage and a torsion spring connected between the cam and the cage, the spring yielding, when excessive torque is reacted by the driven mechanism, to cause the cam to displace the roller or rollers into locking engagement with the outer race. The input torque is then stalled to "earth."

One embodiment of torque limiter according to the invention is illustrated, by way of example, in the accompanying drawing, in which:

FIG. 1 is a longitudinal section,

FIG. 2 is a section on the line II—II in FIG. 1, showing the limiter in the driving position, and FIG. 3 is a similar view showing the limiter locked.

The torque limiter illustrated includes a cam 10, constituting the input member, a plurality of rollers 11, a roller cage 12 constituting the output member, a fixed outer race 13 and a torsion spring 14 connected between the input member 10 and the output member 12. The torsion spring 14 is shown as a torsion bar but it could alternatively be a wound coil spring. In use the input member 10 is connected to an input shaft and the output member 12 to an output shaft.

Under normal conditions a straight through drive is obtained, as indicated in FIG. 2. When driving torque is applied to the input member, torque load is applied to the output member. The torque transmitted is therefore felt by the torsion spring 14 which will deflect when excess torque is reacted by the driven mechanism to cause relative rotation of the cam 10 and the cage 12 to the position shown in FIG. 3 in which the balls 11 are forced outwardly to lock in the wedge angles between the cam 10 and the outer race 13, so stalling the input torque.

As will be apparent, the torque limiter operates for both directions of rotation of the input member. It is resetting in the sense that if, after the input has been stalled, the reacted torque falls to a predetermined level, it will revert to a straight through drive.

The torque limiter could, alternatively, be so designed to maintain its once locked condition until the input torque is deliberately reduced or reversed.

The torque limiter may be an independent unit, or it may be incorporated in the driving unit or the driven unit.

If desired, the torsion spring may be preloaded. The torque limiter will then work exactly as above but because the spring is preloaded, all values of torque which are lower than the preload will be transmitted without deflecting the torsion spring. If the torque level exceeds the spring preload the spring will deflect and the rollers will lock in the wedge angles as before.

What we claim as our invention and desire to secure by Letters Patent is:

1. A torque limiter for limiting the torque which can be applied by an input shaft to an output shaft and comprising a fixed outer race, a cage within the race constituting the output member of the limiter, a cam constituting the input member of the limiter and normally operative to drive the cage by cooperation with at least one roller confined by the cage, and means including torsion spring connected between the cam and the cage for causing the cam to displace the roller into locking engagement with the outer race when excessive torque is applied by the input shaft.

2. A torque limiter according to claim 1, wherein the torsion spring is a torsion bar.

3. A torque limiter according to claim 1, wherein a plurality of rollers are confined by the cage, the torsion spring is a torsion bar, and the means displaces the rollers into locking engagement with the outer race when excessive torque is reacted by the input shaft.

* * * * *